(12) United States Patent
Iwatschenko-Borho et al.

(10) Patent No.: US 7,737,401 B2
(45) Date of Patent: Jun. 15, 2010

(54) RADIATION MEASUREMENT USING MULTIPLE PARAMETERS

(75) Inventors: Michael Iwatschenko-Borho, Erlangen (DE); Norbert Trost, Erlangen (DE); Ralf Pijahn, Erlangen (DE)

(73) Assignee: Thermo Fisher Scientific Inc., Waltham, MA (US)

( * ) Notice: Subject to any disclaimer, the term of this patent is extended or adjusted under 35 U.S.C. 154(b) by 350 days.

(21) Appl. No.: 11/820,488

(22) Filed: Jun. 19, 2007

(65) Prior Publication Data

US 2008/0315110 A1    Dec. 25, 2008

(51) Int. Cl.
    *G01J 5/02*    (2006.01)
(52) U.S. Cl. .................................... 250/339.02
(58) Field of Classification Search ............ 250/339.01, 250/339.02, 361 R, 370.01, 370.07, 370.11
    See application file for complete search history.

(56) References Cited

U.S. PATENT DOCUMENTS 7,022,998 B2    4/2006    Lightfoot et al.

2005/0269501 A1    12/2005    Esin et al.

OTHER PUBLICATIONS

International Search Report and Written Opinion mailed Sep. 8, 2008 in counterpart International Application No. PCT/US08/67534.

*Primary Examiner*—David P Porta
*Assistant Examiner*—Mark R Gaworecki
(74) *Attorney, Agent, or Firm*—Chapin IP Law, LLC; Barry W. Chapin, Esq.

(57) ABSTRACT

An improved radiation detection device measures a broad range of dose rate levels. According to one arrangement, the radiation detection device calculates a radiation value based on, gamma count information representing counts for different energy levels of radiation in a radiation field as well as a radiation intensity indicator value (e.g., photomultiplier tube anode DC current, measured directly by conventional Analog to Digital Converters or indirectly by power or current consumption information indicating how much energy is required to maintain a photomultiplier tube at a constant voltage) that is at least proportional to an amount of overall radiation energy detected in the radiation sample. Based on a combination of the gamma count information and the radiation intensity indicator value, a controller associated with a corresponding radiation detection device can calculate a radiation dose rate associated with the received radiation sample.

22 Claims, 6 Drawing Sheets

RADIATION MEASUREMENT USING MULTIPLE PARAMETERS

BACKGROUND

United States Homeland security requirements set forth a need for devices capable of sensitive detection of gamma rays originating from hidden radioactive material (e.g. ANSI N42.32, IEC 62401). Conventional technology includes commercial grade radiation detectors that are sensitive enough to easily detect small increases in the intensity of a gamma radiation field, which could be of interest regarding the detection of hidden radioactive sources. In certain cases, such radiation detectors are configured as portable devices that measure a so-called dose rate, which is a measure of the biological impact of the current radiation field. A time integration of the dose rate yields the accumulated dose value, which is of significant interest for the user of the radiation measurement device.

Different dose units are in use in various parts of the world and are preferred by different user groups. For example, dose rate can be measures as absorbed dose rate (Gray/hour); ambient dose equivalent rate (Sv/hour), exposure rate (R/hour). For details regarding various conventional definitions, see the ICRU Report 51 of the international Commission on Radiations. In this document the terms "dose rate" and "dose" shall be understood as a generic term for all these quantities.

In this document the term "gamma" or "gamma radiation" is used for any photon radiation above 5 keV (gamma and X-ray radiation). However, by applying or using a gamma count analysis using the highly sensitive detector, which is required for the detection of very small amounts of radiation, the useful measuring range with respect to the dose rate is very limited. Due to saturation above certain gamma count values, these devices are not able to measure radiation at significantly higher levels that are hazardous to a person exposed to such radiation. In contradistinction to the highly sensitive, low-level radiation detector device as discussed above, other types of commercial radiation devices are able to accurately measure levels of radiation well above a background level. However, such devices typically are not sensitive enough to accurately measure a presence of hidden radioactive material, which is known to be present based on a presence of radiation near or just above a natural background radiation level.

Attempts have been made to combine two different types of radiation detector systems into a single portable radiation-measuring device to detect radiation in a broad dose range such as levels just above a background level as well as levels much higher than a background level. One of two such radiation detector systems in the single portable device can be configured to detect radiation at a range just above natural radiation background level, but cannot be configured to measure the dose rate at higher levels of radiation. Another of the two different radiation detector systems can be configured to measure radiation well above the natural background radiation level, but cannot be configured to detect the lower levels of radiation. These different subsystems can produce very inaccurate and inconsistent measurement results in the respective measuring ranges due to different directional and energy response behavior of the different detectors.

SUMMARY

Conventional techniques for accurately measuring wide range of radiation levels suffer from a number of deficiencies as mentioned above. For example, conventional techniques typically require that a user operates a first device to measure the radiation induced dose rate at very high levels above a background level and a second device to detect and measure radiation at levels just above a background radiation level. As mentioned above, attempts have been made to combine two different radiation detection systems into a single portable radiation detection device. However, such a device may be bulky because it includes two independently operating radiation detection systems. Such devices are also inaccurate. Thus, neither of these conventional techniques provides a desirable solution for detecting broad ranges of radiation levels.

Although it is possible to purchase and use two different instruments in order to detect low levels of gamma radiation and measure gamma doses and dose rates, it is desirable to incorporate both high sensitivity radiation detection capability and the high dose rate measurement capability in a single device.

Techniques discussed herein deviate with respect to conventional applications such as those discussed above as well as other techniques known in the prior art. For example, embodiments herein include an improved radiation detection device for measuring a broad range of radiation levels based on, for example, gamma count information representing radiation detected at different energy levels as well as a radiation intensity indicator value representing or reflecting an amount of overall radiation energy detected in the radiation sample. For example, in one embodiment, the radiation intensity indicator value is a value representing a relative amount of power or current required to maintain a photomultiplier tube at a constant voltage. In such an event, a scintillator device absorbs gamma energy and coverts it into photons or light pulses. The photomultiplier tube converts the light pulses received from the scintillator into electronic pulses. Based on a combination of parameters such as the gamma count information and the radiation intensity indicator value, a processor calculates a radiation dose rate associated with the received radiation sample.

Note that use of the radiation count information (e.g., gamma count information) is only by way of example and that embodiments herein support detection of other types of radiation as well.

Embodiments of the present invention are based on the observation that gamma radiation detected by "inorganic" scintillation (i.e., radiation detection) material, such as Thallium doped sodium iodide generates different pulse height distribution depending on received gamma energy. A radiation dose rate can be derived from the measured pulse height distribution as long as both the energy and dose rate dependency is known for the specific detector arrangement. For example, for rather low dose rates, a pulse height analysis (e.g., analysis of the amount of radiation present at each of different energy levels) can be performed to produce an accurate calculation of the dose rate for relatively low-levels of radiation. This is more particularly discussed in co-pending patent application U.S. patent application Ser. No. 11/076, 409 filed on Mar. 8, 2005, entitled "PORTABLE RADIATION MONITOR METHODS AND APPARATUS," the entire teachings of which are incorporated herein by this reference. In other words, for relatively low levels of radiation, a radiation detection device can calculate a radiation dose rate based upon gamma counts (i.e., radiation count information) produced by a plurality of counters that measure different levels of radiation energy as monitored by a detector.

However, one problem with use of such gamma counters (i.e., radiation counter devices) is the inability to accurately measure a presence of radiation at higher levels. For example, as mentioned above, a scintillator can be used to convert received radiation into light pulses that, in turn, are converted into countable electronic signals at different energy levels via a photomultiplier tube. An amplifier is used to amplify the signals form the photomultiplier tube into more usable voltage levels. However, in the presence of high amounts of radiation, an amplifier that produces the electronic pulses from the photomultiplier tube may not be fast enough to create two distinct electronic pulses for two corresponding light pulses generated by the scintillator. In other words, two light pulses produced by the scintillator may only be converted into a single pulse that is counted via the counter devices. Accordingly, the counters may not actually reflect an amount of gamma rays or energy present in a radiation sample.

Embodiments herein solve these and other problems. As an example, for higher dose rates, where, depending on the gamma energy, the count rate of the detected events exceeds the capabilities of even a very fast amplifier associated with the photomultiplier tube, a parameter such as the measured current through a photomultiplier tube indicating an overall detected radiation level is used at least in part to calculate a radiation dose rate.

While it is prior art to use a scintillation detector consisting of so called "tissue equivalent" material for which the generated light output is a direct measure of the dose rate, inorganic scintillators such as NaI(Tl) show a severe energy dependence of the ratio between light output and dose rate and were not yet used for the dose rate measurement at high dose rates. According to one embodiment herein, a measurement of the count rates is combined with the measurement of the integrated light output in order to correct for the above mentioned energy dependence in respect to the dose rate calculation.

One way to measure an overall level of light pulses or photons produced by a respective scintillator is to measure the power or current consumption information of the photomultiplier tube. As more photons are converted into electronic pulses by the photomultiplier tube, more current or power must be provided to the photomultiplier tube. Via application of an appropriate calibration factor to the power consumption information, techniques herein extend an upper limit of a radiation measuring range by several orders of magnitude than would be possible via use of count values alone.

More specifically, a radiation detection device as described herein can include a relatively small sized inorganic scintillator to convert received radiation into light pulses. The radiation detection device also can include a photo detector device (e.g., a photomultiplier tube) and amplifier to convert the light pulses received from the scintillator into electronic signals counted by a set of counter devices. A set of counter devices associated with the radiation detection device measures the levels of the light pulses and, thus, effectively measures the presence of radiation at different energy levels for low radiation levels in which the amplifier does not become saturated.

As discussed above, during saturation when the amplifier often produces only a single electrical pulse for multiple light pulses (e.g., as a result of radiation events) produced by the scintillator, the counts produced by the counters are too inaccurate to allow a precise measurement of the dose rate. To account for or mitigate the affects of such a condition (e.g., saturation or inability to discriminate different pulses detected by the photomultiplier tube), a controller associated with the radiation detection device calculates a radiation dose rate value based on a combination of the counts of one radiation at one or more different energy levels as well as an amount of power (and/or current) consumed by the photo detector device (e.g., photomultiplier tube) to convert the light pulses into the counted electronic signals.

These and other embodiments will be discussed in more detail below.

As mentioned above, note that embodiments herein include one or more radiation detector devices (e.g., a computerized devices, workstations, handheld or laptop computers) to carry out and/or support any or all of the method operations disclosed herein. A radiation detection device can include a controller or processor programmed and/or configured to operate as explained herein to carry out different embodiments of the invention.

Yet other embodiments herein include software programs to perform the steps and operations summarized above and disclosed in detail below. One such embodiment comprises a computer program product that has a computer-readable medium including computer program logic encoded thereon that, when performed in a radiation detection device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as detecting broad levels of radiation. The instructions, when carried out by a processor of a respective computer device, cause the processor to: i) receive gamma count information (i.e., radiation count information) representing counts for different energy levels of radiation in a radiation monitored radiation field; ii) receive a radiation intensity indicator value that is proportional to an amount of overall radiation energy detected in the radiation sample; and iii) based on a combination of the gamma count information (i.e., radiation count information) and the radiation intensity indicator value, calculating a radiation dose rate associated with the received radiation sample.

The numbering of the steps has been added for clarity sake; these steps need not be performed in any particular order.

Other embodiments of the present disclosure include software programs to perform any of the method embodiment steps and operations summarized above and disclosed in detail below.

Also, it is to be understood that the system, method, apparatus, etc. as described herein can be embodied strictly as a software program, as a hybrid of software and hardware, or as hardware alone such as within a processor, or within an operating system or a within a software application. Example embodiments of the invention may be implemented within products and/or software applications such as those manufactured by Thermo Fisher Scientific, Inc. of Waltham, Mass.

As discussed above, techniques herein are well suited for use in radiation detector equipment. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to an example embodiment as described herein, a radiation detection device measures a broad range of radiation levels based on, for example, use of gamma count information representing counts for one or more different energy levels of radiation in a radiation sample (e.g., a monitored radiation field) as well as a radiation intensity indicator value (e.g., power or current consumption information indicating how much energy is required to maintain a photomultiplier tube at a constant voltage) that is proportional to an amount of overall radiation energy (e.g., light energy produced by a scintillator device that converts radiation into light pulses) detected in the radiation sample. Based on a combination of the gamma count information and the radiation intensity indicator value, a controller associated with a corresponding radiation detection device can calculate a radiation dose rate associated with the received radiation sample.

As will be discussed, an example radiation measurement device as described herein offers a convenient, simple and fast method to measure a broad range of gamma radiation via use of a portable device such as a pocket size, low power instrument. In a particular embodiment, the radiation measuring instrument uses an "inorganic" scintillation (i.e., radiation detection) material, such as Thallium doped sodium iodide (e.g., NaI(Tl)) material, which operates in relatively compact or small sizes (e.g., a cylindrical shape with area of 1 to 10 ccm) to detect radiation.

Figure 1:
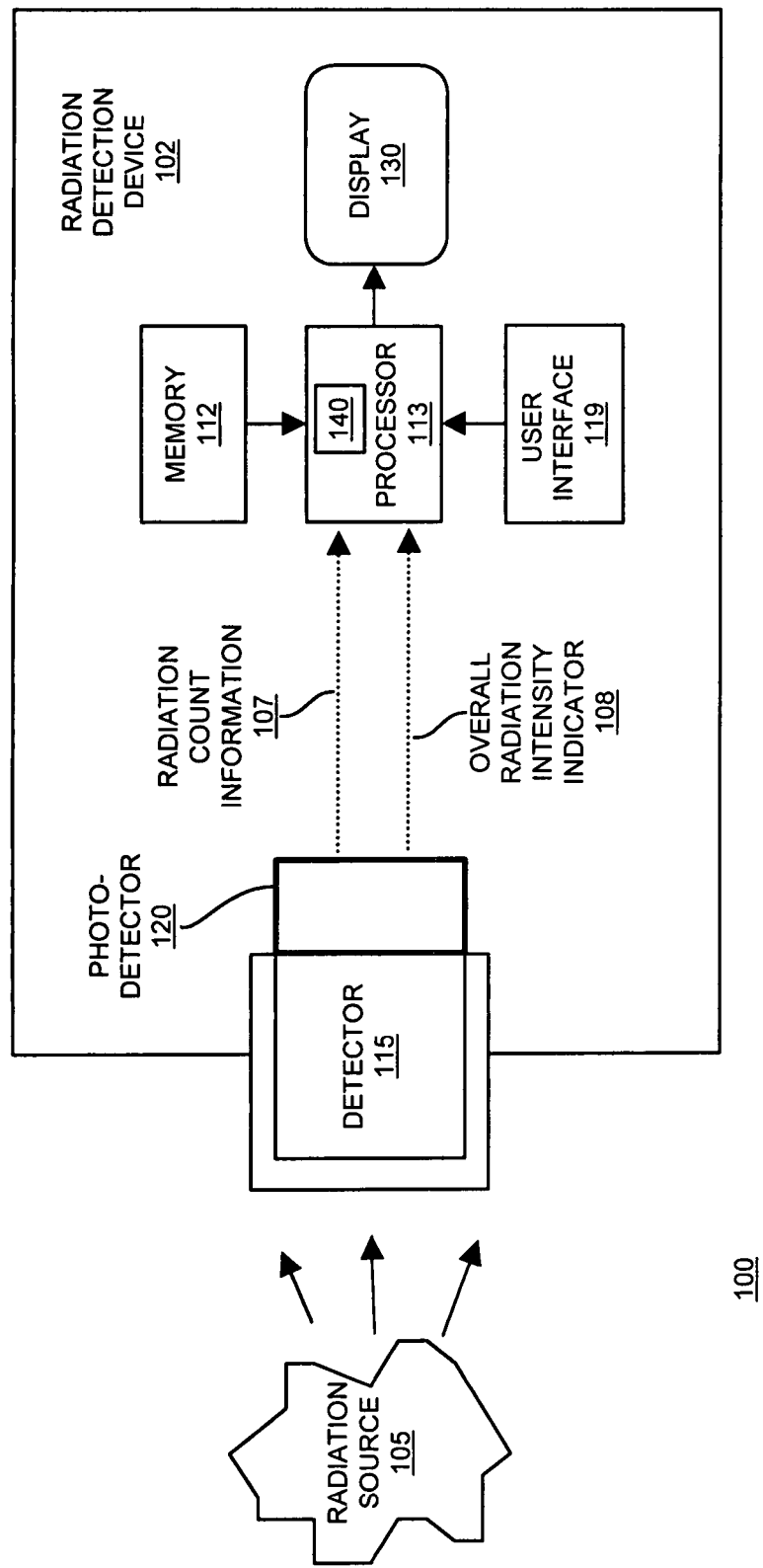
FIG. 1 is an example block diagram of a radiation environment and measurement device according to embodiments herein.

FIG. 1 is a block diagram illustrating a radiation detection device 102 operating in environment 100 according to embodiments herein. The radiation detection device 102 includes a detector 115 (e.g., a scintillator that converts radioactive energy into light pulses), a photo-detector 120 (e.g., a photomultiplier tube), processor 113 (e.g., a digital signal processor), memory 112, user interface 119 (e.g., a keypad, etc.), and display screen 130.

During general operation of the radiation detection device 102, radiation source 105 emits a radiation field such as gamma rays that strike detector 115. Detector 115 (e.g., a scintillator) converts the received radiation filed (e.g., gamma rays) into photons (e.g., light). At least a portion of the light emitted by detector 115 strikes photo-detector 120. Accordingly, photo-detector 120 detects at least a portion of photons emitted by detector 115.

Processor 113 monitors one or more parameters associated with the detector/photo-detector 115 to determine a dose rate associated with a monitored radiation field such as that produced by radiation source 105. For example, processor 113 can receive radiation count information 107 as well as an overall radiation intensity indicator 108 associated with photo-detector 120. In one embodiment, radiation count information 107 indicates a number of light pulses (and thus radiation events) produced at each of multiple different energy thresholds (e.g., radiation thresholds). Overall radiation intensity indicator 108 can represent or be proportional a value proportional to an intensity of the light or photons received from photo-detector 120 regardless of the associated individual energy levels. In other words, a large number of small light pulses or a small number of large light pulses can yield the same value for the overall radiation intensity indicator 108.

Figure 2:
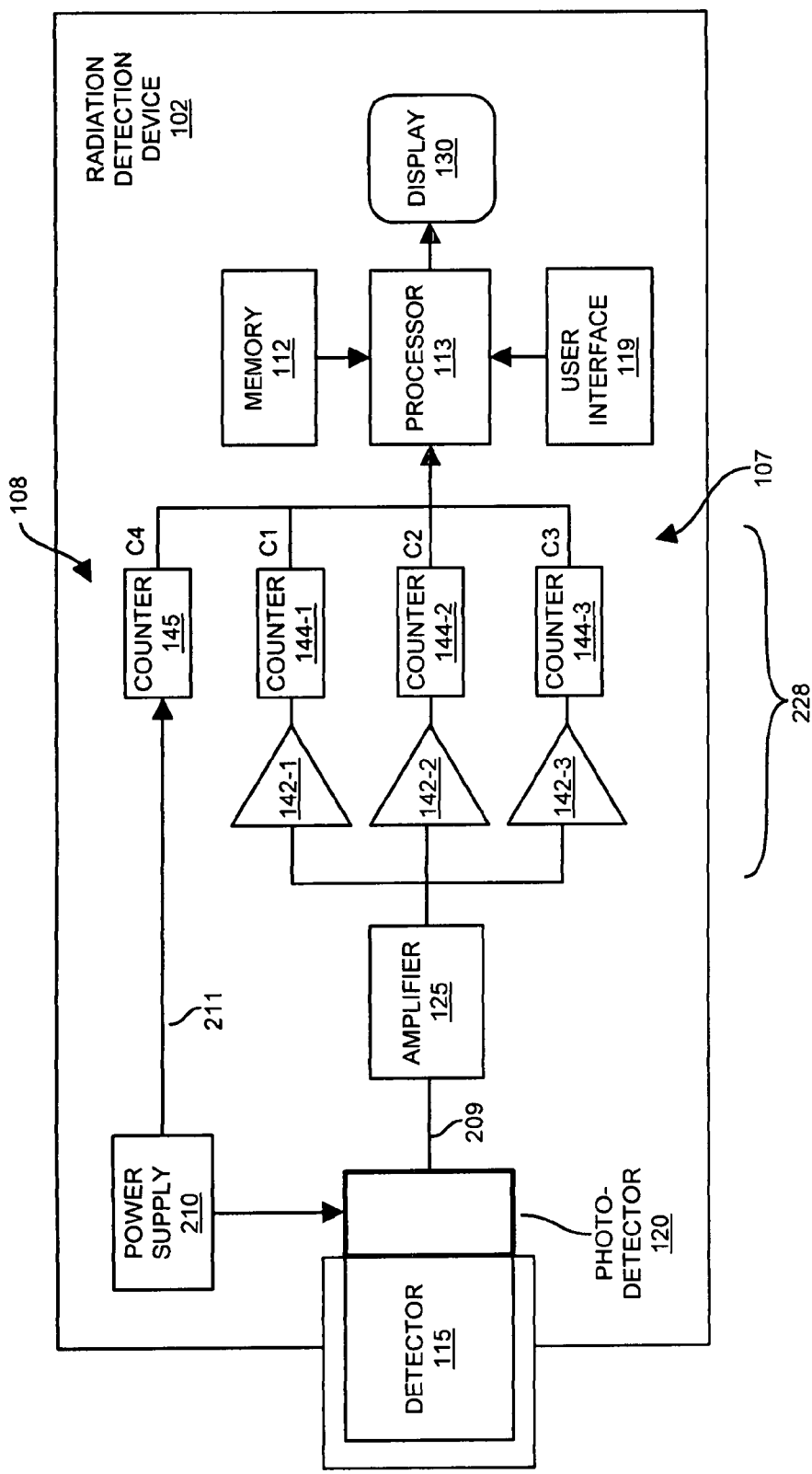
FIG. 2 is an example block diagram of a radiation measurement device according to embodiments herein.

Radiation measurement function 140 executed by processor 113 utilizes the received radiation count information 107 and overall radiation intensity indicator 108 to produce a radiation dose rate measurement An example of an embodiment for discriminating different light pulses to produce the radiation count information 107 (e.g., radiation count values at different energy threshold values) and a way of producing the overall radiation intensity indicator 108 is more particularly discussed in FIG. 2.

FIG. 2 is an example diagram illustrating radiation detection device 102 according to embodiments herein. As shown, radiation detection device 102 includes a detector 115, photo-detector 120, power supply 210, amplifier 125, comparators 142 (e.g., comparator 142-1, comparator 142-2, comparator 142-3, . . . ), counters 144 (e.g., counter 144-1, counter 144-2, counter 144-3, . . . ), counter 145, memory 112, processor 113, user interface 119, and display screen 130.

As previously discussed, detector 115 (e.g., a scintillator device) absorbs high-energy radiation (from source 105) and emits corresponding photons that are, in turn, detected by photo-detector 120. The number of photons emitted by detector 115 depends on the level of energy absorbed by detector 115.

Based on the photons striking photo-detector 120, photo-detector 120 (e.g., a photomultiplier tube) generates an electrical signal 109 to drive the input of amplifier 125. For example, a higher number of photons associated with a radiation event produce higher pulse amplitude of electrical signals 209 passed to the amplifier 125.

Detector 115 can be made from "inorganic" scintillation (i.e., radiation detection) material such as Thallium doped sodium iodide NaI(Tl) material. This type of material facilitates conversion of gamma energy into light energy in a manner as discussed above. A benefit of using NaI(Tl) in detector 115 is that the detector 115 can be configured into a relatively compact form using this material. As previously discussed, the detector 115 operates to convert gamma energy into (visible or invisible) light energy.

As an alternative to use of NaI(Tl) in detector 115, detector 115 can include other types of scintillation material such as Cesium Iodide (CsI) to convert gamma energy into photons.

As discussed above, in one embodiment, photo-detector 120 is a photo-multiplier tube, which receives light emitted by detector 115 and electrically couples to amplifier 125. In such an embodiment, the photo-multiplier tube operates to receive an optical signal from the detector 115 (e.g., as caused by interaction of radiation with the NaI(Tl) material of detector 115 as previously discussed), generate an electrical signal or electrical pulses proportional to the light signal (e.g., proportional to the intensity of the light signal), and transmit the output pulses to the amplifier 125.

The amplifier 125, such as a linear amplifier, can be configured to adjust the pulse amplitude levels of respective output pulses to enable a discrimination of different pulse amplitude levels (corresponding to different radiation energy levels) via use of comparators 142. Counters 144 driven by comparators 142 measure a presence of radiation at different discrete energy levels. Higher count values indicate presence of higher levels of radiation.

In one embodiment, the radiation detection device 102 (e.g., gamma radiation measuring instrument) utilizes one or more comparators 142, each having a given threshold or threshold range, to achieve energy discrimination of the detected gamma radiation. Typical values correspond to gamma energies at one or more discrete threshold values in a range such as between 1 and 3000 kilo-electron Volts. Each comparator 142 includes a corresponding counter 144 (e.g., pulse counter) to detect a number of radiation events in a given comparator range. Accordingly, via respective counters 144-1, 144-2, and 144-3, the processor 113 keeps track of the count rates for different threshold energy ranges.

Additional details associated with measuring a level or levels of radiation and use of counters can be found in related U.S. patent application Ser. No. 11/076,409 filed on Mar. 8, 2005, entitled "PORTABLE RADIATION MONITOR METHODS AND APPARATUS," the entire teachings of which are incorporated herein by this reference.

Based on a determination of count levels, processor 113 can analyze levels of radiation emitted by radiation source 105 and provide an indication of the energy deviation ratio to a user and/or other devices. For example, in one arrangement as shown, processor 113 drives display screen 130 to provide an indication of a level of detected gamma radiation. In other embodiments, the processor 113 additionally or alternatively drives an audio device (e.g., a speaker), vibrator, and/or LED, etc. to warn when a respective energy deviation ratio reaches a dangerous or pre-determined threshold value.

In contradistinction to measuring radiation at different energy levels (as do counters 144-1, 144-2, and 144-3), counter 145 can be a value representing an overall radiation intensity of light (and therefore radiation) over a spectrum, rather than the individual number of pulses in a specific energy range as do counters 144. For example, in one embodiment, as further discussed below, count C can vary depending on the total light intensity in the scintillator (e.g., intensity of light as produced by the scintillator as a result of exposure to a corresponding radiation field).

More specifically, in one embodiment, power supply 210 provides power to photo-detector 120. When photo-detector 120 is a photomultiplier tube, power supply 210 operates to maintain the photo-detector 120 at a constant voltage such as 800 volts. Power supply 210 can include a battery and a DC-DC converter that produces the constant voltage applied to the photo-detector 120. During operation, power supply 210 can provide information (e.g., photomultiplier tube anode current information associated with photo-detector 120) via encoding and transmission of signal 211 to counter 145 (e.g., or register).

In one embodiment, signal 211 is proportional to an amount of photomultiplier tube anode current required by photo-detector 120. For example, signal 211 can be an oscillating signal or pulse rate (associated with a DC-DC converter in the power supply 210), whose frequency varies depending on how many photons are detected by the photo-detector 120. Use of the pulse rate (as opposed to other current or power measuring techniques), eliminates the need for extra circuitry (e.g., an analog-to-digital converter, amplifier, etc.) otherwise needed to measure power or current associated with the photo-detector 120.

In general, signal 211 is a higher frequency value (or includes a higher density of countable pulses) when photo-detector 120 converts a higher number of photons into electrical signal 209 used to drive amplifier 125. Conversely, signal 211 is a lower frequency value (or includes a lower density of countable pulses) when photo-detector 120 converts fewer photons into electrical signal 209 used to drive amplifier 125.

Counter 145 produces and stores a count value C, which varies depending on a number of oscillations associated with signal 211. As mentioned above, signal 211 is set to a proportionally higher frequency when more photons are detected by photo-detector 120. Thus, in one embodiment, counter C represents an overall radiation intensity indicator 108 associated with light or photons detected by photo-detector 120 because the value of counter C varies depending on how many photons are detected by photo-detector 120.

Of course, other techniques can be used to produce a value or parameter that is indicative of an amount of photons produced by photo-detector 115. For example, photo-detector 120 can include any of one or more additional photo detector devices that produce a measurable value representative of the number of photons produced by detector 115. As mentioned above, such a device need not discriminate amongst energy levels, as this function is provided by amplifier 125, comparators 142, and counters 144.

As will be discussed later in this specification, processor 113 utilizes count values (e.g., count C1, count C2, count C3, and count C) to produce a radiation dose rate value (indicative of an amount of gamma radiation emitted by radiation source 105) for display on display screen 130.

As mentioned above, energy analysis circuitry 228 includes comparators 142 and counter 144. For example, the radiation detection device 102 utilizes at least two comparators 142, each having a given threshold (or threshold range), to achieve energy discrimination of radiation received from source 105. Typical example values for a 3 threshold arrangement such as that provided by comparator 142-1, comparator 142-2 and comparator 142-3 correspond to photon energies above 30 keV, above 200 keV and above 500 keV. In other words, comparator 142-1 enables a measurement of energy above 30 keV; comparator 142-2 enables a measurement of energy above 200 keV; comparator 142-3 enables a measurement of energy above 500 keV. Each comparator 142 includes a corresponding counter (e.g., pulse counter) 144 to count a number of radiation events within a given range or above a threshold value.

Processor 113 electrically couples to the counters 144 and is configured to receive count rates read from the counters 144. For example, C1, C2, and C3 are the count rates read out from the respective counters 144-1, 144-2, 144-3, such as every second or in smaller intervals, for each energy threshold level (e.g., C1 is for counts of particles impacting the scintillators in the greater than 30 KeV energy band, C2 is for counts of particles impacting the scintillators in the greater than 200 KeV energy band, and C3 is for counts of particles impacting the scintillators in the greater than 500 KeV energy band).

In one embodiment, the processor 113 is a microcontroller device having a corresponding arithmetic logic unit, and a corresponding storage representative for storing code and data. The microcontroller can include additional resources such as counters 144 and/or comparators 142.

In order to extend the useful measuring range of the radiation detection device 102, a dead time correction formula can be applied to the measured count rates C1, C2, C3, etc. For example, processor 113 can be configured to calculate the dose rate (e.g., energy independent dose rate), based upon the count rates, as:

$$\text{DoseRate}(\text{count}) = K(\text{count}) * (a*C1 + b*C2 + c*C3 \ldots + n*Cn).$$

The values of a, b, c, . . . , n are weighing factors for each energy level threshold such as, for example, 2, 25, 50, 100, 200, associated with each corresponding one of counters 144.

In one embodiment, a derived dose rate value can be filtered by a digital RC-filter or sliding mean value filter implemented by processor 113.

A value of the calibration factor, K(count), depends on the material and size of the crystal and the units (e.g., Gy/h, Sv/h, R/h or Rem/h) in which the dose rate is supposed to be expressed. Using modern state-of-the art amplifier techniques, count rates of up to 1 million counts per second (or slightly above) can be measured using counters 144. Generation of pulses (e.g., from photo-detector 120) above this value generally cannot be measured accurately for reasons as discussed below.

Figure 3:
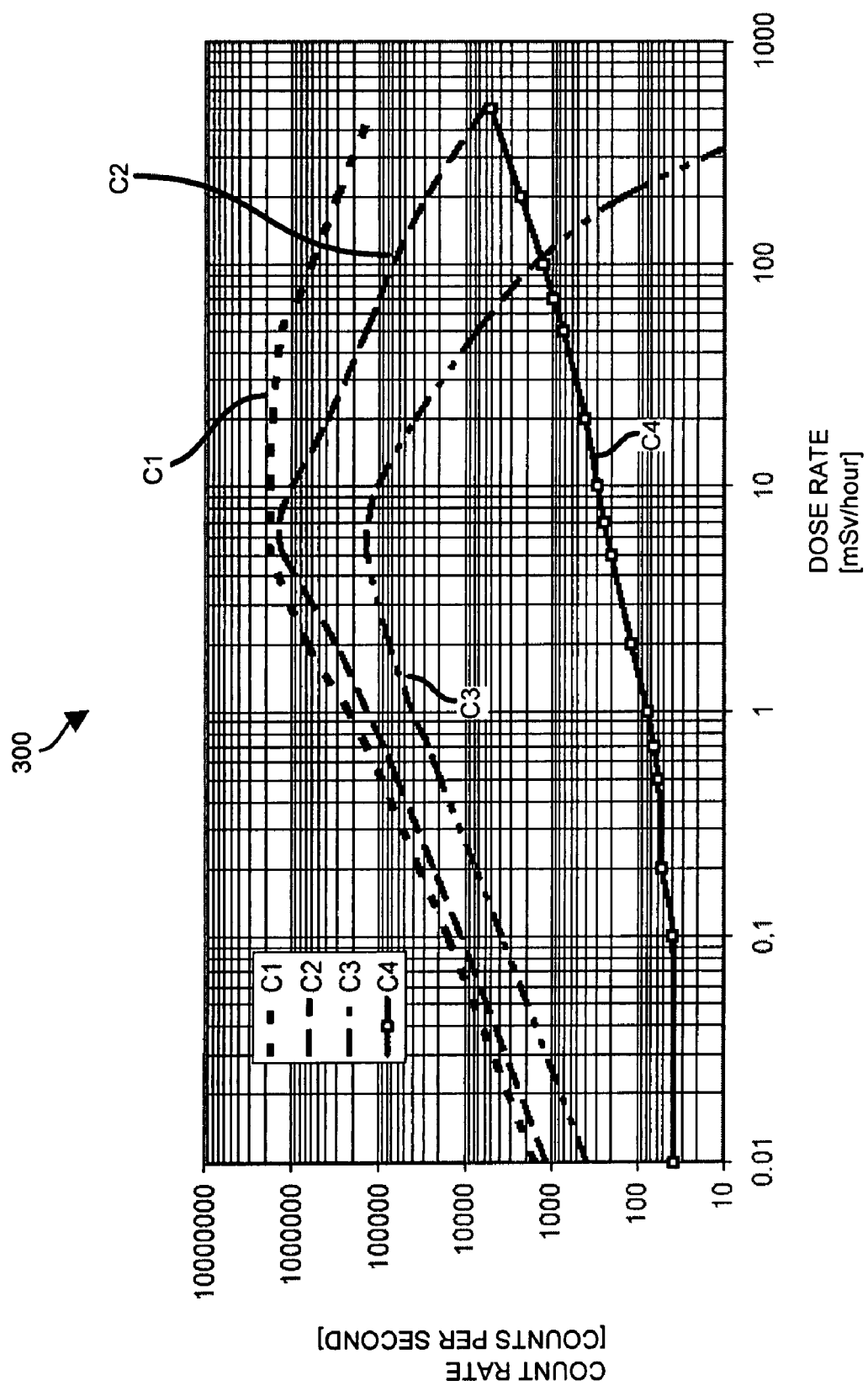
FIG. 3 is an example graph illustrating count rate versus radiation dose rate according to embodiments herein.

A graph of count rates and corresponding dose rate calculations according to embodiments herein is shown in FIG. 3. The dose rate values (mSv/h) as given in the figure and discussed in the text are given as example and refer to a certain gamma energy and detector arrangement, e.g. detector size and amplifier dead time. For count values of microprocessor to about 1,000,000 counts per second after dead time correction when there is no unacceptable saturation yet, graph 300 provides a way to convert radiation count information 107 (e.g., count C1, count C2, count C3, etc.) into a corresponding dose rate. This conversion is captured in the Dose Rate(count) equation above. Thus, either the graph 300 or DoseRate (count) equation can be used to generate a radiation dose rate value below about 7 to 10 mSv/h.

Unfortunately, count values C1, C2, and C3 by themselves cannot be used to derive a radiation dose rate above about 7 to 10 mSv/h. The ambiguity in graph 300 arises because the pulses produced by the photo-detector 120 overlap with each other above a certain radiation dose rate value of 7 to 10 mSv/h. In other words, during saturation (e.g., greater than about 1,000,000 counts per second) when two pulses overlap with each other and appear as a single pulse, the counters C1, C2, and C3 do not properly represent or count the occurrence of radiation at each of the different radiation energy levels such as because the amplifier 125 is too slow.

Due to the high sensitivity of radiation detection device 102, such high count rates are achieved at rather low dose rates. For example, a typical small size NaI(TI) crystal of 10 ccm (cubic centimeters) volume reaches a count rate C1 of 1 million cps (counts per second) for x-rays (e.g., low energy gamma radiation below approximately 100 keV) below 0.5 mSv/h (e.g., milliSievert per hour). At higher dose rates, for reasons as discussed above, all count rates C1 to C3 generally decrease and cannot be used for direct derivation of the dose rate. For higher gamma radiation energies, the peak count rates may appear at 10 mSv/h, but start to decrease at higher dose rates as well. This produces an ambiguity. For example, suppose count C3 was measured as 10,000 counts per second. The corresponding dose rate could be either 0.2 mSv/h or 40 mSv/h according to the graph 300. These represent substantially different amounts of radiation.

Embodiments herein involve use of count value C (e.g., an overall radiation intensity indicator 108 as discussed above) as well as radiation count information 107 (e.g., the count values at different energy levels) to produce a radiation dose rate value.

In general, the radiation intensity indicator 108 does not experience saturation problems as do count values C1, C2, and C3 when the amplifier 125 and/or photo-detector 120 (e.g., photomultiplier tube) becomes saturated. By itself, the radiation intensity indicator 108 may not properly produce an accurate radiation dose rate. For accuracy, embodiments herein include utilizing the overall radiation intensity indicator 108 (e.g., count C, which provides an indication when saturation occurs) as well as use the individual counter values at different energy threshold values (even though they do not reflect an actual number of radiation events) to produce a radiation dose rate. In other words, embodiments herein include an equation and/or look-up table to convert a combination of different received parameters (e.g., the overall radiation intensity indicator 108 and/or radiation count information 107) into a radiation dose rate value associated with a radiation sample.

According to a specific embodiment, a combination of count rates C1, C2, C3 and count rate C (representing a relative level of current or power supplied to the photo-detector 120) are used to determine the average gamma energy (e.g., radiation dose rate) in a broad radiation dose rate range including higher dose rate ranges where saturation occurs. For example, count values C1, C2, and C3 can be used to apply an appropriate calibration factor to count value C to produce an accurate radiation dose rate value. regardless of the specific (=generally unknown) gamma energy. Performing the dose rate calculation using the overall radiation intensity indicator 108 alone yields different results for different gamma energies. Instead, although inaccurate above a threshold value, the count values C1, C2, and C3 are still valuable for calculating a radiation dose rate. In other words, even though the count values C1, C2, and C3 do not accurately reflect a number of radiation events above a peak count value as in graph 300, they at least provide a relative indication of the gamma energy associated with the events being detected. For this reason, a combination of the radiation count information 107 and the overall radiation intensity indicator 108 (e.g., intensity of light energy produced by scintillator detector 115) can be used to accurately derive an actual radiation dose rate value.

According to an example embodiment as discussed above, a high voltage applied to the photo-detector 120 can be generated by an arrangement of blocking oscillator type converters. A controller associated with power supply 210 includes a corresponding resource (e.g., a transistor driver) that controls a switching transistor in power supply 210 via application of rectangular-shaped pulses having a constant width. As the photo-detector 120 requires more energy (as a result of a large quantity of light produced by detector 115), the controller increases application of pulses to the switching transistor to increase an amount of power or current supplied to keep the voltage of the photo-detector at a constant voltage value. The amount of switching is proportional to a number of photons detected by photo-detector 120. Thus, a presence of more pulses indicates a greater amount of light detected by the photomultiplier tube, while fewer pulses indicate a lesser amount of light in the photomultiplier tube. Above a threshold value, the count value C does not experience inaccuracy issues as do the counters C1, C2, and C3 as a result of saturation.

A frequency of these pulses that is necessary to maintain the high voltage is represented by the count rate C and is a monotonic function of the radiation intensity for a given gamma energy. However, the dose rate may not be accurately derived from C if the corresponding gamma energy associated with the monitored radiation field is not known. As an example, the same value C is achieved for a dose rate of 10 mSv/h (1 Rem/h) of 100 keV radiation as for a dose rate of approximately 50 mSv/h (5 Rem/h) of 1 MeV radiation. It is therefore beneficial to use the radiation count information 107 (e.g., count rates C1, C2, C3) in order to correct the dose rate calculation based on the current measurement represented by C.

For example, in one embodiment the processor 113 calculates a radiation dose rate based on the following equation:

DoseRate(current)=$W(C1,C2,C3,C)*K$(current)$*(C-C(0))$=Dose rate as derived from current measurement taking the pulse height distribution into account $W(C1, C2, C3, C)$: Weighing factor function for correction of the gamma energy dependence of the current to dose rate dependence.

K(current): a calibration factor, whose value depends on specifications of the radiation detection device 102

C(0): Threshold count rate of the high voltage generator.

As an example, a calibration procedure according to embodiments herein can be described as follows:

$W(C1,C2,C3,C)=0.15+(C-C(0))/C(0)*(C2+10*C3)/C1$, where C(0): measured rate C at 4 mSv/h for Cs-137 and
where K(current): Calibration factor in order to achieve the true dose rate at 70 mSv/h for Cs-137.

Figure 4:
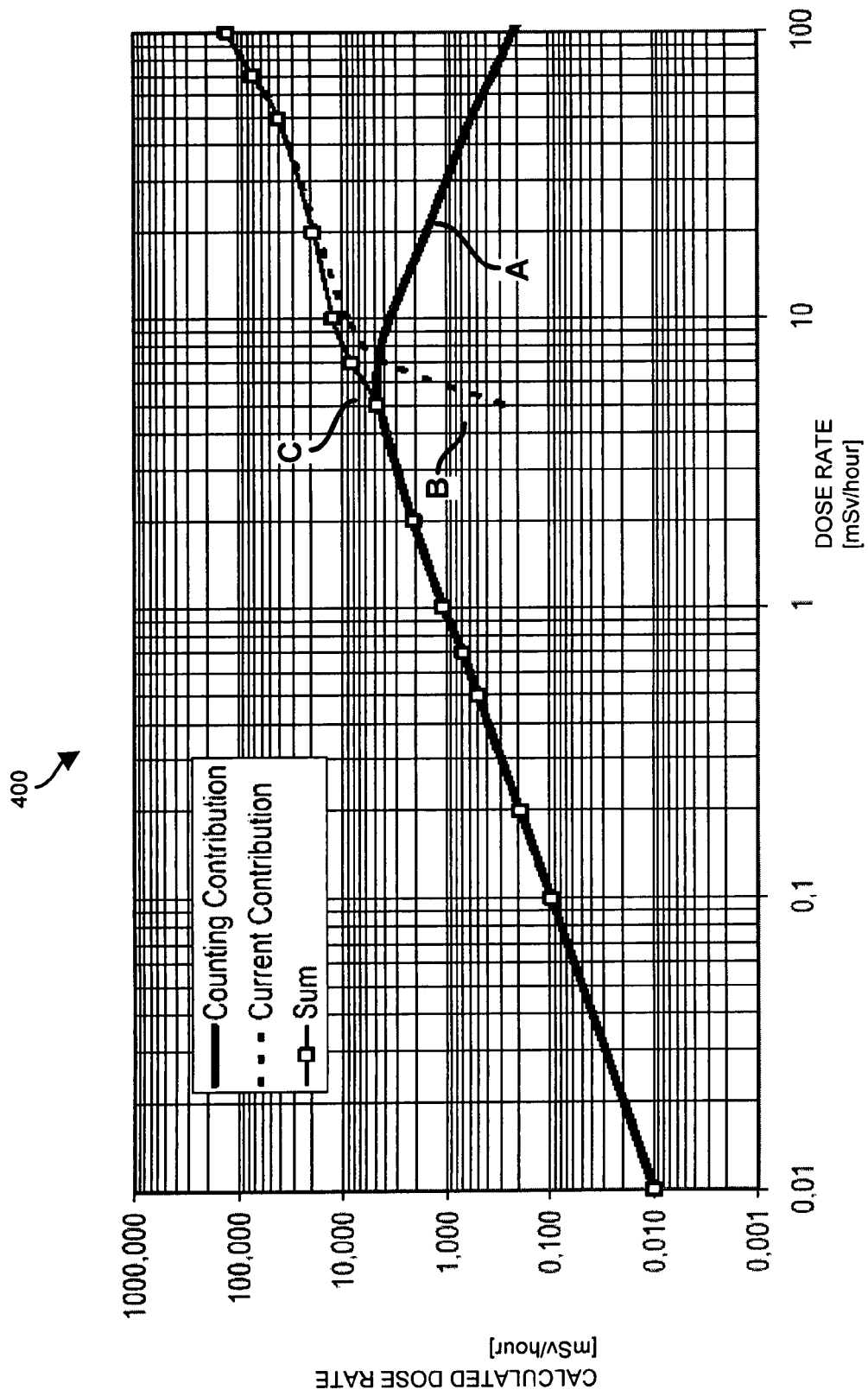
FIG. 4 is an example graph illustrating a function to produce a dose rate based on a combination of radiation count information and a radiation intensity indicator according to embodiments herein.

FIG. 4 is a graph 400 illustrating how different parameters (e.g., radiation count information 107 and overall radiation intensity indicator 108) can be used to calculate a radiation dose rate according to embodiments herein. For example, below a radiation dose rate of about 5 mSv/hour, a radiation dose rate can be determined largely based on radiation count information 107 as represented by line A. Above this threshold value, a combination of radiation count information 107 as represented by line A and overall radiation intensity indicator 108 as represented by line B can be used to calculate a radiation dose rate. Line C represents a calculated radiation dose rate using contribution from both radiation count information 107 and overall radiation intensity indicator 108.

Referring again to FIG. 2, processor 113 can be configured to provide an indication of the energy deviation ratio and/or measured radiation dose rate to a user via display screen 130 or other sensory device. For example, in one arrangement, processor 113 can be configured to drive display screen 130 and display a calculated radiation dose rate in numerical form. In another arrangement, the processor 113 can be configured to drive other devices such as one or more light emitting diodes (LEDs), sound generators, and/or vibrators to warn a user when the energy deviation ratio reaches a particular threshold value.

In one embodiment, the radiation detection device 102 is configured as a computerized device (e.g., radiation detection device 102 includes one or more processors). For example, as mentioned above, radiation detection device 102 includes processor 113. Memory 112 (e.g., a computer readable medium) and/or a respective repository can store an application, logic instructions and/or respective data (associated with radiation measurement function 140) that are executed or utilized by processor 113 to carry out calibration and radiation measurements according to techniques discussed herein.

Memory 112 can be of any type of volatile or non-volatile memory or, alternatively, storage system such as a computer memory (e.g., random access memory (RAM), read only memory (ROM), or another type of memory), disk memory, such as hard disk, floppy disk, optical disk, etc. Accordingly, one embodiment herein includes a computer-readable medium encoded with the functional instructions associated with radiation measurement function 140.

The processor 113 can be any type of circuitry or processing device such as a central processing unit, computer, controller, application specific integrated circuit, programmable gate array, or other circuitry that can access the radiation measuring application encoded within the memory 112 in order to run, execute, interpret, operate, or otherwise perform the radiation measuring application logic instructions. In other words, in one embodiment, processor 113 executes an application or code stored in memory 112 to carry out techniques as discussed herein.

Functionality supported by radiation detection device 102 and, more particularly, functionality associated with radiation measurement function 140 will now be discussed via flowcharts in FIGS. 5 and 6. For purposes of the following discussion, the radiation detection device 102 (or corresponding sub-components) generally performs steps in the flowcharts.

Figure 5:
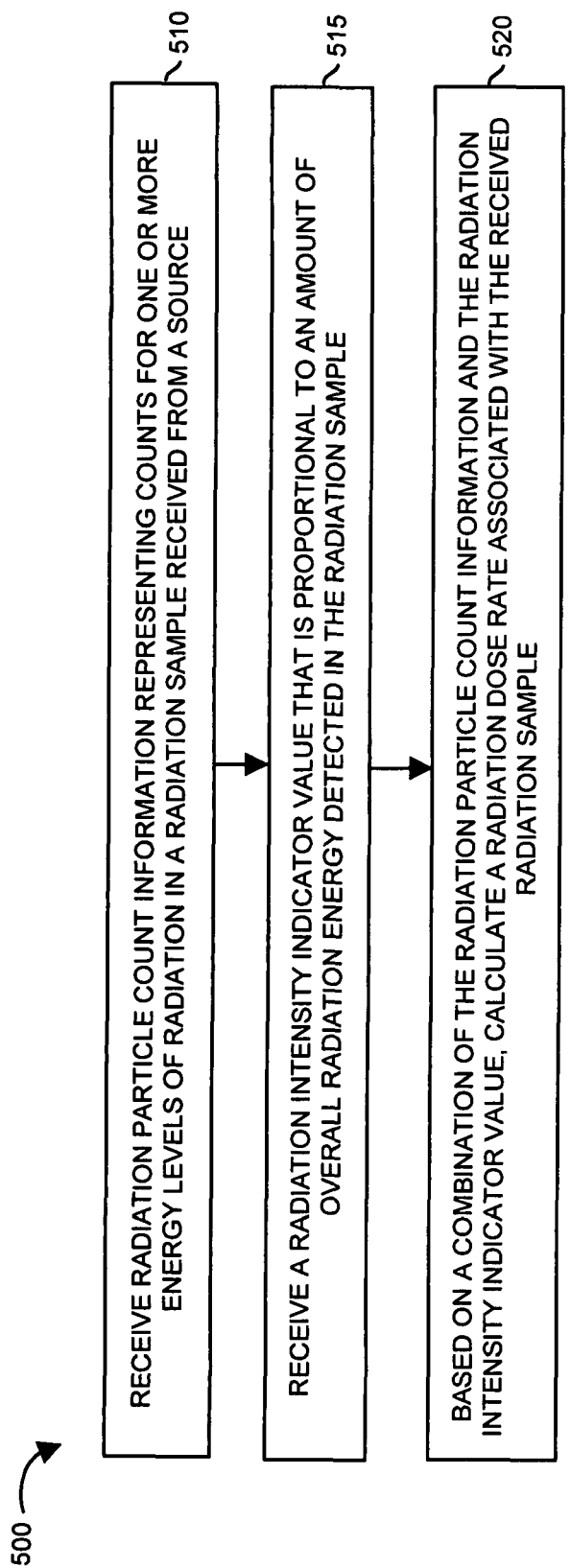
FIG. 5 is an example diagram of a flowchart illustrating a technique of measuring radiation according to embodiments herein.

FIG. 5 is a flowchart 500 illustrating a technique of producing a radiation measurement value according to embodiments herein. Note that flowchart 500 of FIG. 5 and corresponding text below will make reference to matter previously discussed with respect to FIGS. 1-4.

In step 510, processor 113 in the radiation detection device 102 receives gamma count information 107 representing counts for different energy levels of radiation in a monitored radiation field.

In step 515, processor 113 receives a radiation intensity indicator value 108 (e.g., count C) that is proportional to an amount of overall radiation energy detected in the radiation sample. The count C can be a value proportional to a relative number of photons detected by photo-detector 120.

In step 520, via the radiation dose rate equation above, processor 113 calculates a radiation dose rate associated with the monitored radiation field based on a combination of the (gamma) radiation count information 107 and the radiation intensity indicator value 108.

Figure 6:
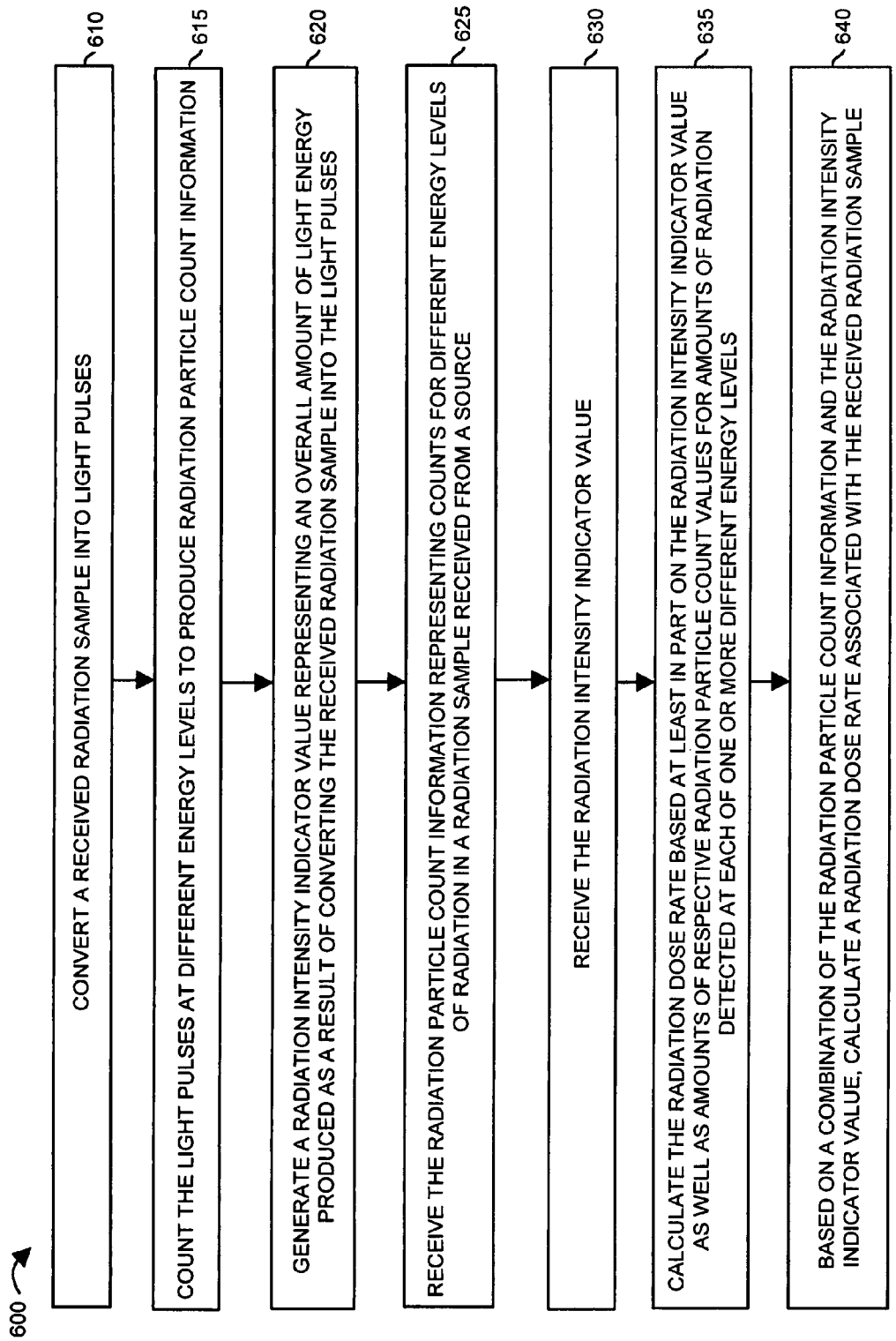
FIG. 6 is an example diagram of a flowchart illustrating more specific techniques of measuring radiation dose rates according to embodiments herein.

FIG. 6 is a flowchart 600 illustrating a technique of measuring a radiation dose rate associated with a monitored radiation field according to embodiments herein. Note that flowchart 600 of FIG. 6 and corresponding text below will make reference to matter previously discussed with respect to FIGS. 1-5.

In step 610, the detector 115 converts a monitored radiation field into light pulses.

In step 615, counters 144 (e.g., counters 144-1, 144-2, and 144-3) count the light pulses produced by detector 115 at different energy levels to produce (gamma) radiation count information 107.

In step 620, counter 145 stores a radiation intensity indicator 108 value representing an overall amount of light energy or photons produced as a result of converting the monitored radiation field into the light pulses.

In step 620, processor 113 receives the (gamma) radiation count information 107 representing counts for different energy levels of radiation in a monitored radiation field such as that produced by radiation source 105.

In step 625, the processor 113 receives the radiation intensity indicator value 108 from counter 145.

In step 630, the processor 113 calculates the radiation dose rate based at least in part on the radiation intensity indicator value 108 and radiation count information 107 (e.g., amounts of respective gamma radiation count values for amounts of radiation detected at each of one or more different energy levels).

In step 635, based on a combination of the (gamma) radiation count information 107 (e.g., count C1, count C2, and count C3) and the radiation intensity indicator value 108 (e.g., count C), the processor 113 calculates a radiation dose rate associated with the monitored radiation field using the equation or graphs as discussed above.

Note again that techniques herein are well suited for measurement of radiation dose rates. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
    receiving radiation count information representing counts for different energy levels of radiation in a monitored radiation field;
    receiving a radiation intensity indicator value that is proportional to an amount of overall radiation energy detected in the monitored radiation field;
    based on a combination of the radiation count information and the radiation intensity indicator value, calculating a radiation dose rate associated with the monitored radiation field;
    converting the monitored radiation field into light pulses; and
    generating the radiation intensity indicator value as a count value that varies depending on an amount of power consumed by a photo detector device to convert the light pulses into countable electronic signals at the different energy levels.

2. A method as in claim 1, wherein calculating the radiation dose rate associated with the monitored radiation field includes calculating the radiation dose rate based at least in part on the radiation intensity indicator value as well as amounts of respective gamma count values for amounts of radiation detected at each of the multiple different energy levels in the monitored radiation field.

3. A method as in claim 1, wherein calculating the radiation dose rate associated with the monitored radiation field includes calculating the radiation dose rate based at least in part on weighted amounts of respective gamma count values at the different energy levels.

4. A method as in claim 1, wherein calculating the radiation dose rate associated with the monitored radiation field includes calculating the radiation dose rate based at least in part on a distribution of detected radiation energies in the monitored radiation field at the different energy levels.

5. A method as in claim 1 further comprising:
    counting the light pulses at different energy levels to produce the radiation count information.

6. The method as in claim 1, wherein the radiation intensity indicator value is a count value representing a number of oscillations associated with a switching power supply signal used to power the photo detector device.

7. A method comprising:
    receiving radiation count information representing counts for different energy levels of radiation in a monitored radiation field;
    receiving a radiation intensity indicator value that is proportional to an amount of overall radiation energy detected in the monitored radiation field;
    based on a combination of the radiation count information and the radiation intensity indicator value, calculating a radiation dose rate associated with the monitored radiation field;
    converting the monitored radiation field into light pulses;
    counting the light pulses at different energy levels to produce the radiation count information; and
    wherein receiving the radiation intensity indicator value includes receiving a power consumption value representing an amount of power consumed by a photomultiplier tube that is used to convert the light pulses into electrical pulses that are counted at the different energy levels to produce the radiation count information.

8. A system comprising:
    a processor;
    a memory unit that stores software code executed by the processor; and
    an interconnect coupling the processor and the memory unit, enabling the system to execute the software code and perform operations of:
        receiving radiation count information representing counts for different energy levels of radiation in a monitored radiation field;
        receiving a radiation intensity indicator value that is proportional to an amount of overall radiation energy detected in the monitored radiation field; and
        based on a combination of the radiation count information and the radiation intensity indicator value, calculating a radiation dose rate associated with the monitored radiation field, the system further comprising:
    a scintillator configured to convert the monitored radiation field into light pulses;
    a plurality of counters configured to count the light pulses at different energy levels to produce the gamma count information; and
    wherein the radiation intensity indicator value is a power consumption value representing an amount of power consumed by a photodetector device that is used to convert the light pulses into electrical pulses that are counted at the different energy levels to produce the radiation count information.

9. A system as in claim 8, wherein calculating the radiation dose rate associated with the monitored radiation field includes calculating the radiation dose rate based at least in part on the radiation intensity indicator value as well as amounts of respective gamma count values for amounts of radiation detected at each of the multiple different energy levels in the monitored radiation field.

10. A system as in claim 8, wherein calculating the radiation dose rate associated with the received radiation includes calculating the radiation dose rate based at least in part on weighted amounts of respective gamma radiation count values at the different energy levels.

11. A system as in claim 8, wherein calculating the radiation dose rate associated with the monitored radiation field includes calculating the radiation dose rate based at least in part on a distribution of detected radiation energies in the monitored radiation field at the different energy levels.

12. A system as in claim 8 further comprising:
a resource configured to generate the radiation intensity indicator value to be proportional to an overall amount of light energy of the light pulses produced by the scintillator.

13. A system comprising:
a processor;
a memory unit that stores software code executed by the processor; and
an interconnect coupling the processor and the memory unit, enabling the system to execute the software code and perform operations of:
 receiving radiation count information representing counts for different energy levels of radiation in a monitored radiation field;
 receiving a radiation intensity indicator value that is proportional to an amount of overall radiation energy detected in the monitored radiation field;
 based on a combination of the radiation count information and the radiation intensity indicator value, calculating a radiation dose rate associated with the monitored radiation field, the system further comprising:
a scintillator to convert the radiation field received into light pulses;
a photo detector device configured to convert the light pulses into countable electronic signals; and
a counter configured to generate the radiation intensity indicator value as a count value that varies depending on an amount of power consumed by the photo detector device to convert the light pulses into the countable electronic signals at the different energy levels.

14. The method as in claim 13, wherein the radiation intensity indicator value is a count value representing a number of oscillations associated with a switching power supply signal used to power the photo detector device.

15. A method comprising:
receiving radiation count information derived from monitoring a radiation field;
receiving power consumption information of a radiation detection device used to measure the radiation field, the power consumption information varying depending on an amount of energy present in the radiation field; and
based on a combination of the radiation count information and the power consumption information, calculating a radiation dose rate associated with the radiation field.

16. A method as in claim 15, wherein receiving the radiation count information includes receiving a respective radiation count value for each of multiple different energy levels of radiation present in the radiation received from the source.

17. A method as in claim 16, wherein calculating the radiation dose rate associated with the radiation received from the source includes calculating the radiation dose rate based at least in part on the power consumption information as well as amounts of respective gamma radiation count values for the multiple different energy levels.

18. A method as in claim 16, wherein calculating the radiation dose rate associated with the received radiation includes calculating the radiation dose rate based at least in part on weighted amounts of respective gamma radiation count values at the multiple different energy levels.

19. A method as in claim 15, wherein calculating the radiation dose rate includes calculating the radiation dose rate based at least in part on a distribution of detected radiation at different energy levels in the radiation field.

20. A computer-readable storage medium having instructions stored thereon for processing data information, such that the instructions, when carried out by a processing device, enable the processing device to perform the operations of:
receiving radiation count information derived from monitoring a radiation field;
receiving power consumption information of a radiation detection device used to measure the radiation field, the power consumption information varying depending on an amount of energy present in the radiation field; and
based on a combination of the radiation count information and the power consumption information, calculating a radiation dose rate associated with the radiation field.

21. A computer-readable storage medium as in claim 20, wherein calculating the radiation dose rate includes calculating the radiation dose rate based at least in part on the power consumption information as well as amounts of respective radiation count values for amounts of radiation detected at each of multiple different energy levels.

22. A computer-readable storage medium as in claim 21, wherein calculating the radiation dose rate includes calculating the radiation dose rate based at least in part on a distribution of radiation detected at the multiple different energy levels.

* * * * *